(12) United States Patent
Argue et al.

(10) Patent No.: US 10,002,378 B2
(45) Date of Patent: Jun. 19, 2018

(54) INFORMING CUSTOMERS REGARDING ITEMS ON THEIR SHOPPING LIST

(71) Applicants: Stuart Argue, Palo Alto, CA (US); Anthony Emile Marcar, San Francisco, CA (US)

(72) Inventors: Stuart Argue, Palo Alto, CA (US); Anthony Emile Marcar, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 377 days.

(21) Appl. No.: 13/723,174

(22) Filed: Dec. 20, 2012

(65) Prior Publication Data

US 2014/0180865 A1 Jun. 26, 2014

(51) Int. Cl.
*G06Q 30/00* (2012.01)
*G06Q 30/06* (2012.01)

(52) U.S. Cl.
CPC ................ *G06Q 30/0633* (2013.01)

(58) Field of Classification Search
CPC ........ G06Q 30/0633; G06Q 30/0601
See application file for complete search history.

(56) References Cited

U.S. PATENT DOCUMENTS

| | | | |
|---|---|---|---|
| 5,666,493 A | 9/1997 | Wojcik | |
| 5,789,732 A * | 8/1998 | McMahon | G06K 19/07703 235/380 |
| 5,878,401 A * | 3/1999 | Joseph | G06Q 10/087 705/22 |
| 5,884,281 A | 3/1999 | Smith | |
| 6,249,773 B1 | 6/2001 | Allard | |
| 6,324,520 B1 * | 11/2001 | Walker et al. | 705/16 |
| 6,587,835 B1 | 7/2003 | Treyz | |
| 7,424,447 B2 * | 9/2008 | Fuzell-Casey et al. | 705/26.81 |
| 7,908,175 B2 | 3/2011 | Chang | |
| 8,170,915 B2 | 5/2012 | Borders | |

(Continued)

FOREIGN PATENT DOCUMENTS

WO  WO2001075552 A2  10/2001

OTHER PUBLICATIONS

Katia Campo et al. "Towards Understanding Consumer Response to Stock-Outs", Journal of Retailing, vol. 76(2) pp. 219-242, ISSN: 0022-4359, Copyright © 2000 by New York University.*

(Continued)

*Primary Examiner* — Naeem U Haq
(74) *Attorney, Agent, or Firm* — Bryan Cave Leighton Paisner LLP

(57) ABSTRACT

Systems and methods are disclosed for alerting a customer when an item is out of stock or in stock. In embodiments, the customer may add items to a shopping list within a shopping list software application (commonly known as an "app") installed on a mobile computing device such as a smart phone. According to embodiments of the present disclosure, if one or more items on the shopping list become out-of-stock, and/or later become in-stock, the system may transmit an alert to be displayed on the shopping list app to notify the customer. The system may notify the customer regarding relevant changes in product inventories at selected retail store branches where the customer is most likely to shop and/or has recently shopped.

20 Claims, 5 Drawing Sheets

(56) References Cited

U.S. PATENT DOCUMENTS

| | | |
|---|---|---|
| 8,429,026 B1 | 4/2013 | Kolawa |
| 2002/0174021 A1 | 11/2002 | Chu |
| 2003/0154135 A1* | 8/2003 | Covington et al. ............. 705/26 |
| 2007/0136140 A1 | 6/2007 | Smith |
| 2010/0070338 A1 | 3/2010 | Siotia |
| 2010/0138281 A1* | 6/2010 | Zhang ................. G06Q 20/203 |
| | | 705/28 |
| 2012/0221393 A1* | 8/2012 | Ouimet et al. ............ 705/14.23 |
| 2012/0296770 A1* | 11/2012 | Lin .................... G06Q 30/0601 |
| | | 705/26.8 |
| 2012/0303480 A1 | 11/2012 | Stone |
| 2013/0262995 A1 | 10/2013 | Howell |
| 2013/0268317 A1 | 10/2013 | Mattila |
| 2014/0067564 A1 | 3/2014 | Yuan |

OTHER PUBLICATIONS

Thomas W. Gruen et al. "A Comprehensive Guide to Retail Out-of-Stock Reduction in the Fast-Moving Consumer Goods Industry",© Copyright 2007-2008 by the Grocery Manufacturers Association (GMA), ISBN: 978-3-905613-04-9.*

Abhaya Asthana et al. "An Indoor Wireless System for Personalized Shopping Assistance", Mobile Computing System and Applications, 1994, pp. 69-74. (Year: 1994).*

* cited by examiner

INFORMING CUSTOMERS REGARDING ITEMS ON THEIR SHOPPING LIST

BACKGROUND

With the advent and proliferation of miniaturized handheld computing devices, commonly known as "mobile devices" or "smart phones," a shopping trip can be made significantly more convenient to consumers by using a shopping list software application (commonly known as an "app") installed on a smart phone. A user may enter specific desired products into a shopping list app to build a shopping list, and may later refer back to the shopping list while shopping. At times, desired products may be out-of-stock while the user is shopping, which could result in inconvenience to the user and lost sales to the retailer.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
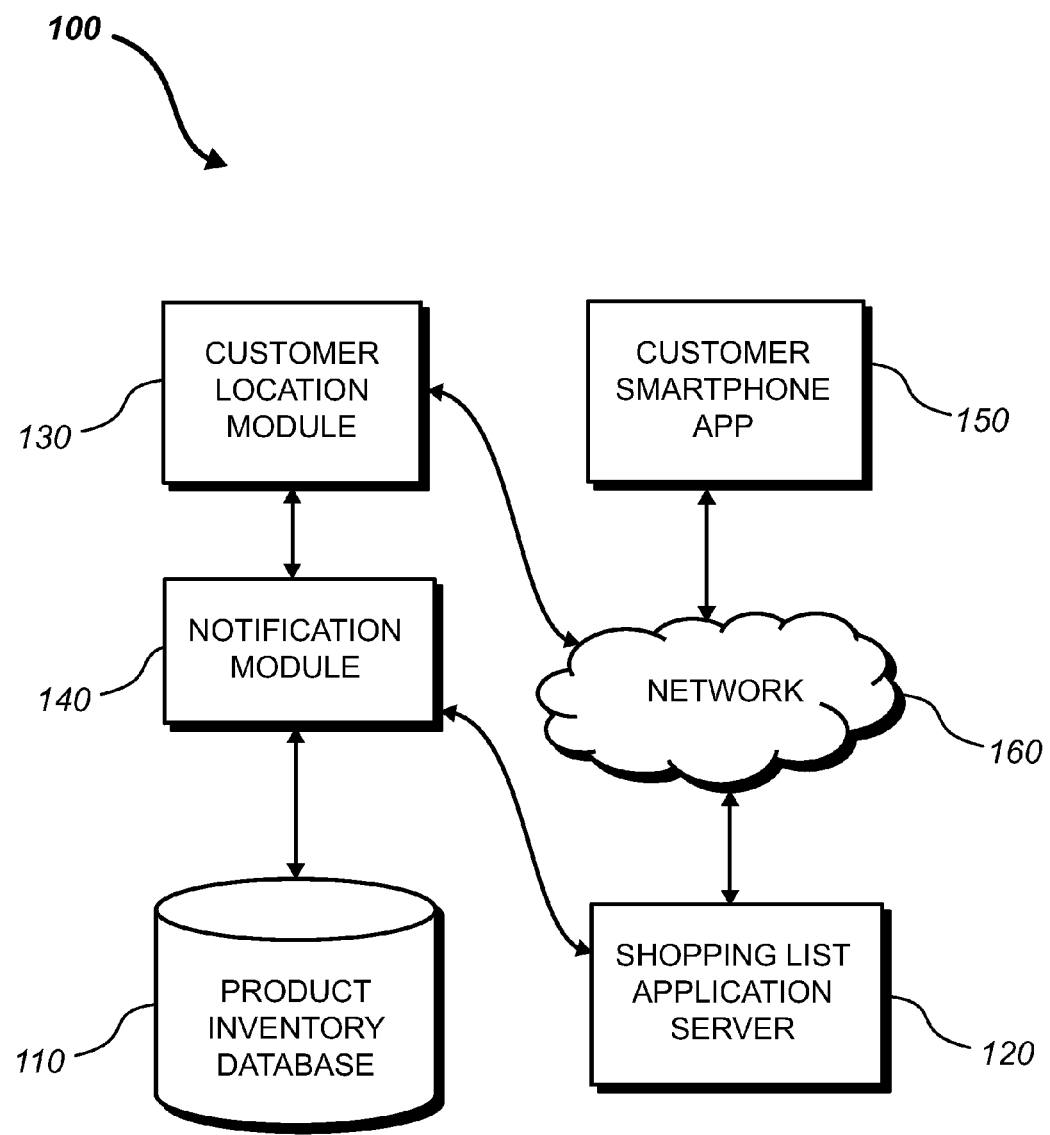
FIG. 1 is a block diagram representation of a shopping list item notification system according to embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Systems and methods of the present disclosure may increase the convenience for retail customers using electronic shopping lists installed as a mobile computing device application ("smartphone app") provided by a retailer, thereby increasing the likelihood that the customers will shop at the retailer. Embodiments of the present disclosure include systems and methods that notify a customer if any item in the customer's shopping list built on the customer's smartphone app is currently out-of-stock or if a previously out-of-stock item subsequently becomes in-stock.

With reference to FIG. 1, embodiments of the present disclosure include shopping list item notification system 100, comprising remote servers, databases, and/or computer workstations that fulfill the functions disclosed and described herein. Shopping list item notification system 100 comprises product inventory database 110, shopping list application server 120, customer location module 130, and notification module 140. Product inventory database 110 is adapted to store data related to items. Particularly, product inventory database 110 may maintain inventory status data for items. The stored data may include an inventory status for each item at particular retail store branches. In an embodiment, product inventory database 110 includes an update module by which the stored inventory status may be updated to reflect current information. The update module may employ a system that is automatically updated by receiving and analyzing transaction information and determining an item's resulting inventory therefrom. Alternatively, the product inventory database 110 may be updated through human means, such as by inventory inspections by retail associates. An embodiment of the present disclosure comprises an update module comprising both automatic and manual updating means. In an embodiment, inventory status data stored in product inventory database 110 is associated with a universal product code ("UPC") for each product. In an alternative embodiment, a unique product identifier code that incorporates a store branch identifier may be used so that a product inventory status at any selected retail branch may be quickly ascertained by querying product inventory database.

Shopping list application server 120 is adapted to interface with a customer smartphone app 150 over network 160. Shopping list application server 120 may transmit data and instructions to customer smartphone app 150 to thereby cause smartphone app 150 to produce an out-of-stock alert or an in-stock alert for the customer. In embodiments, shopping list application server 120 is adapted to receive data from customer smartphone app 150 regarding one or more retail items selected by customer and added to a shopping list. Shopping list application server 120 can transmit identification codes regarding such selected retail items to notification module 140.

In embodiments, shopping list application server 120 is adapted to store customer location data. Such customer location data may include a customer's residence or place of work. Such data may further include an identification code for a retail store branch that is in closest proximity to the customer's residence or place of work. Further, if the customer has selected a preferred shopping location, shopping list application server 120 may record that expressed preference. Likewise, if a customer's shopping history implicitly demonstrates that the customer may prefer to shop at a specific retail store branch, application server 120 can record that implicit preference. Other factors and/or behaviors may be analyzed to determine a customer's preferred store branch. In alternative embodiments, shopping list application server 120 can identify and record multiple preferred store branches if the customer's behavior demonstrates that multiple stores branches may jointly be preferred by the customer. Shopping list application server 120 can transmit the identification of one or more preferred store branches to notification module 140. In embodiments, shopping list application server 120 receives instructions from notification module 140 regarding an alert to be created by customer smartphone app 150. Shopping list application server 120 can retransmit such instructions to customer smartphone app 150.

In embodiments, customer location module 130 is adapted to monitor a customer's location and transmit a signal to notification module 140 if a customer approaches and/or enters a retail store branch. The signal transmitted by customer location module 130 may include data specifying the particular retail store branch that the customer is approaching or entering. The customer location module 130 may receive location information from customer smartphone app 150 regarding the customer's present location. In alternative embodiments, customer location module 130 predicts when a customer may be en route to a store branch by comparing movement patterns to prior observer movement behavior, and transmits a signal to notification module 140 accordingly.

In embodiments of the present disclosure, notification module 140 is adapted to transmit data to shopping list application server 120 regarding the inventory status of one or more items in a customer's shopping list, which data may include instructions for shopping list application server 120 to transmit an alert to customer's smartphone app 150 regarding the item inventory status. Notification module 140 can determine an appropriate time to transmit an alert to customer smartphone app 150, which may depend on an anticipated shopping trip the customer may take in the future or other criteria. An alert may be created when customer location module 130 detects that a customer is entering, will shortly enter, or has recently entered a retail store branch.

Notification module 140 is adapted to receive identification codes for products included on the customer's shopping list and query product inventory database 110 for the inventory status of those products at a selected retail store branch. The selected retail store branch may comprise a customer's preferred store branch or other store branch into which the customer has entered or may shortly enter.

Notification module 140 may periodically query product inventory database 110 for updates with respect to a product inventory status. Alternatively, notification module 140 may be adapted to query product inventory database 110 upon certain conditions being met, such as the customer opening the shopping list smartphone app 150. In alternative embodiments, product inventory database 110 is adapted to associate certain products and retail store branches with a customer who has added such products to the customer smartphone app 150 shopping list. Upon a change in the inventory status of a product that is on a customer's shopping list, product inventory database 110 can transmit an inventory update signal to notification module 140 regarding the change in inventory status, which may cause the notification module 140 to direct shopping list application server 120 to transmit an alert to customer smartphone app 150 regarding the change in inventory status. An inventory update signal may be transmitted by product inventory database 110 in response to a change in inventory status for products listed in multiple shopping lists of various customers. In alternative embodiments, product inventory database 110 is adapted to transmit an inventory update signal in response to an inventory change for products listed on active shopping lists. Active shopping lists may include shopping lists that have been viewed, retrieved, and/or updated within a certain timeframe.

A software application, referred to herein as customer smartphone app 150, may be stored on the customer's mobile computing device as computer-readable instructions in the form of circuitry, memory, combinations thereof, or the like. Customer smartphone app 150 is adapted to receive inputs from a customer representing products to be added to the customer's shopping list. The shopping list may be stored in local memory on the mobile computing device or may be stored at shopping list application server 120. Customer smartphone app 150 is adapted to transmit product identifier codes, such as UPC numbers, to shopping list application server 120 as the associated items are added to a shopping list within the smartphone app 150. In an alternative embodiment, customer smartphone app 150 transmits a group of product identifier codes to shopping list application server 120 some time after the customer has completed assembling a shopping list.

Customer smartphone app 150 is further adapted to receive an alert signal from shopping list application server 120 regarding a change in inventory status for one or more products that the customer has previously added to the shopping list. The customer smartphone app 150 may alert the customer with a visual notification, an audible notification, a haptic stimulus, or combinations thereof. A user preference may be input to the smartphone app 150 by the customer to select a preferred alert method.

In embodiments, customer smartphone app 150 may be incorporated partially or completely in a web-based interface that is accessible from a browser or like interface. Such access may be through a mobile computing device, a desktop computing device, a tablet computing device, a laptop computing device, or other like devices.

In alternative embodiments, network 160 comprises any communication network including, but not limited to: a wireless network, a cellular network, an intranet, the Internet, or combinations thereof.

Product inventory database 110, shopping list application server 120, customer location module 130, and notification module 140 may all be implemented in one or more servers. Further, each of product inventory database 110, shopping list application server 120, customer location module 130, and notification module 140 may comprise multiple servers to increase system efficiency by dividing tasks. The multiple servers may have mirrored data to prevent data loss in case of a disk failure and/or to decrease access and response times for database queries. In alternative embodiments of the present disclosure, product inventory database 110, shopping list application server 120, customer location module 130, and notification module 140 may be carried out by computer-readable instructions and data stored on the customer's mobile computing device.

Figure 2:
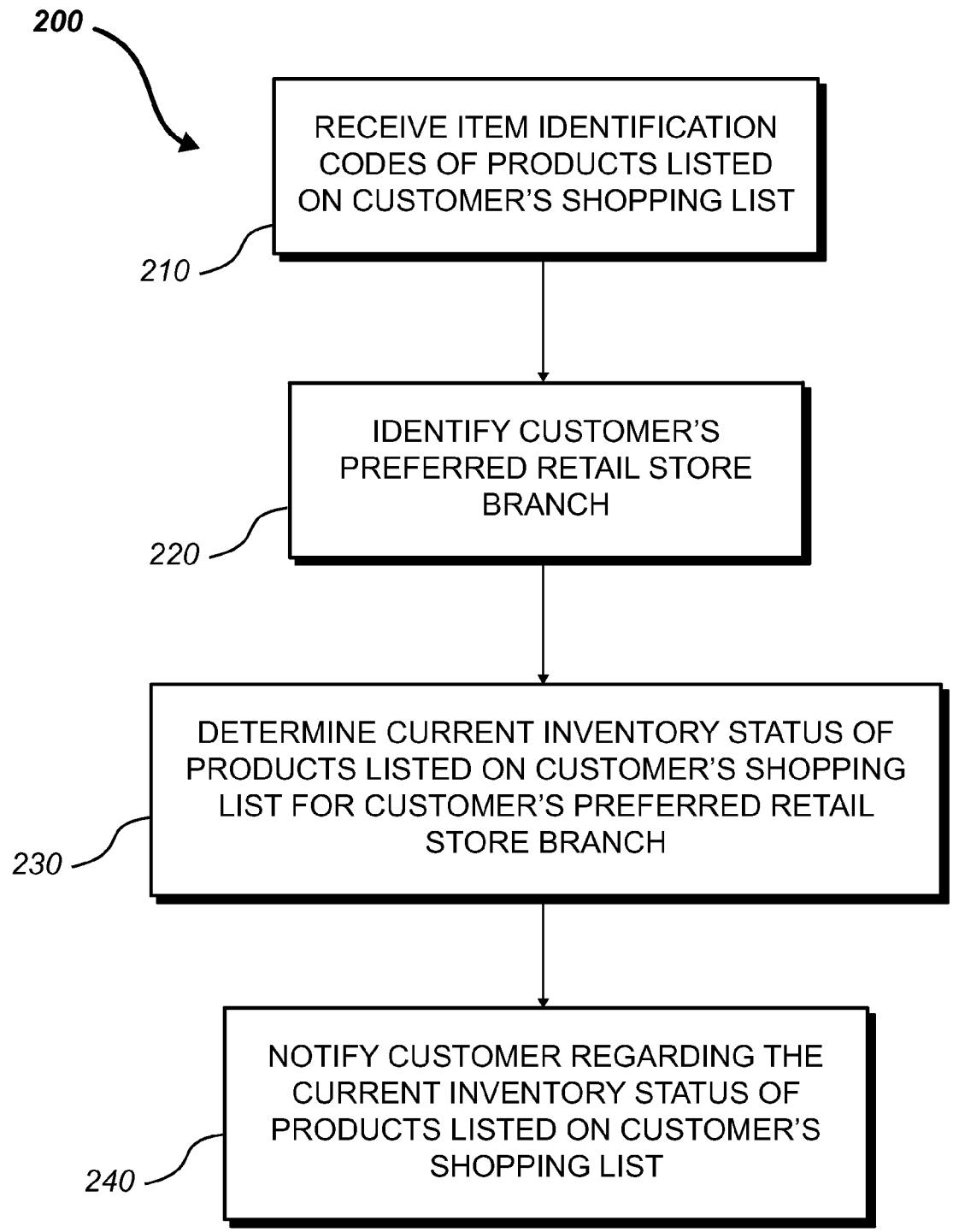
FIG. 2 is a flow chart illustration if an example method for informing customers regarding items on their shopping list according to embodiments of the present disclosure.

In operation, item notification system 100 is adapted to provide a notice to a customer when a particular item has become out-of-stock or has become in-stock at a selected and/or preferred store branch. Referring now to FIG. 2, embodiments of the present disclosure comprise method 200. At operation 210, shopping list application server 120 receives product codes corresponding to one or more items that a customer has added to the customer's shopping list within the customer smartphone app 150. Shopping list application server 120 is adapted to transmit the product codes to notification module 140. Notification module 140 may store the product codes in a memory for later recall. Such product codes may be associated with a specific retail store branch as described in regards to operation 220.

At operation 220, a preferred retail store branch is identified with respect to the customer. The notification module 140 may identify the preferred retail store branch by retrieving such data from a memory, by analyzing past purchase behavior of the customer, by analyzing known customer data such as residence or place or work, or other methods. Customer location module 130 may transmit location information for the customer, including the location of the customer's selected retail store branch, an identification of the retail store branch closest to customer's place of work or residence, a retail store branch that customer has recently shopped at, or a retail store branch that customer is currently in, to notification module 140.

At operation 230, notification module 140 queries product inventory database 110 with respect to one or more items that the customer has added to the customer's shopping list within customer smartphone app 150. Product inventory database 110 is adapted to respond to the query with information related to the current inventory status of such products at the customer's preferred retail store branch. Current inventory status for an item may include data regarding whether the item is currently in stock at the preferred retail store branch. If application server 120 identifies multiple preferred retail store branches for the customer, notification module 140 may query product inventory database 110 with respect to the product inventory status at each of the preferred retail store branches.

In embodiments of the present disclosure, notification module 140 may periodically query product inventory database 110 with respect to one or more shopping list items. Alternatively, notification module 140 may query product inventory database 110 upon certain conditions being met, such as the customer entering a retail store branch. In other embodiments, updated inventory data are transmitted to notification module 140 shortly after a stock inventory check has been completed that shows a relevant change in inventory status.

At operation 240, notification module 140 transmits current inventory status information for selected products to shopping list application server 120. Shopping list application server 120 transmits a signal to customer smartphone app 150 regarding items that are on customer's shopping list, causing the smartphone app 150 to notify the customer regarding the current inventory status of the items. In particular, customer smartphone app 150 may display a visual notification, an audible alert, a haptic stimulus, or a combination thereof to alert the customer that the inventory status of a selected item has changed. If a customer previously added an item to the shopping list within customer smartphone app 150, and that item is later out of stock at the customer's preferred store branch, the customer may be alerted to that fact through such a notification, alert, stimulus, or combination thereof. Likewise, if a selected item that was previously out-of-stock at the preferred store branch later becomes in-stock, the customer may be similarly notified of the change in inventory status.

Figure 3:
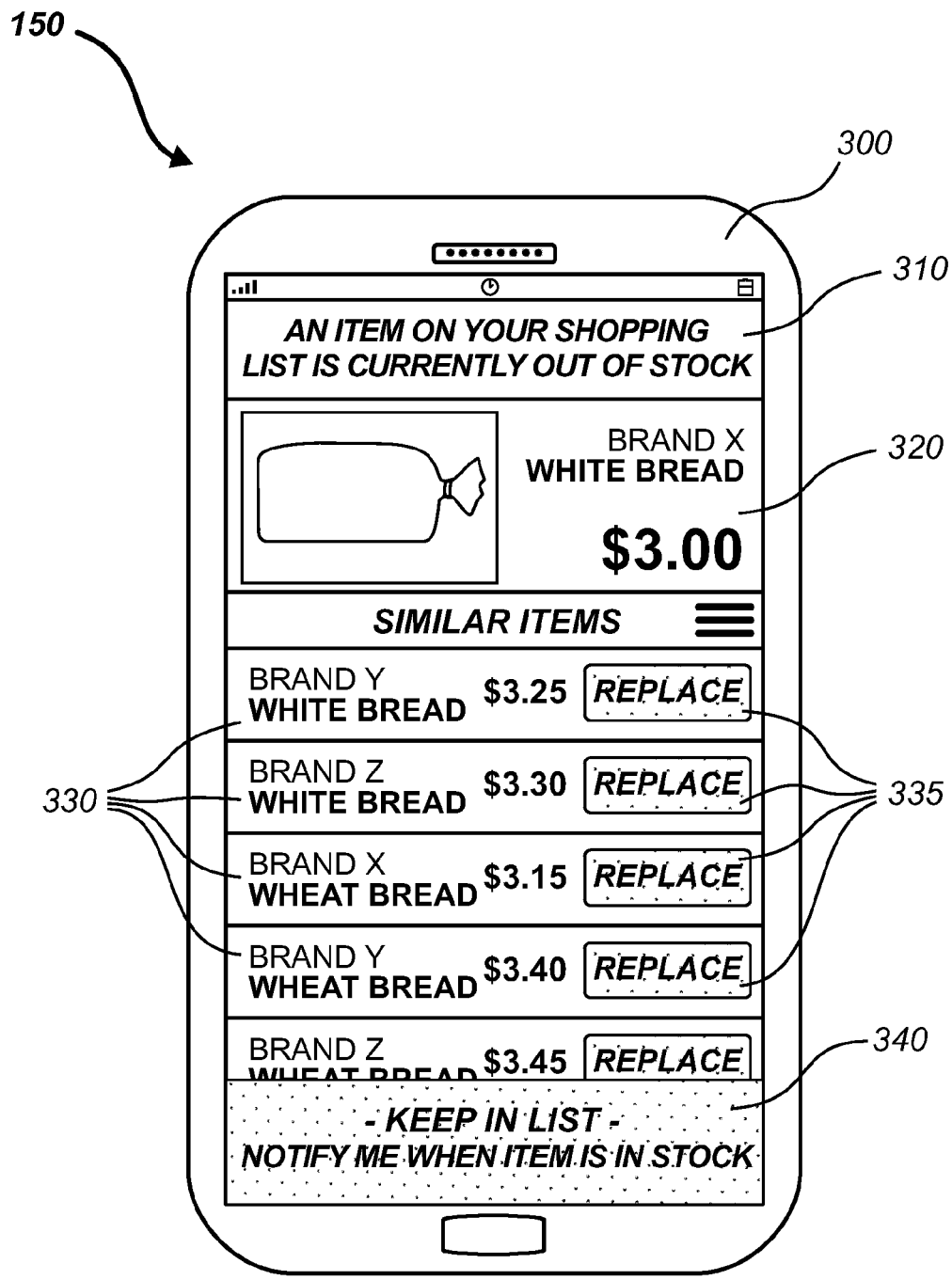
FIG. 3 is an illustration of a mobile computing device displaying an example graphical user interface having an out-of-stock alert for an item on a customer's shopping list.

Referring now to FIG. 3, a graphical user interface representing customer smartphone app 150 is depicted on a smartphone 300. As shown in FIG. 3, an alert 310 is displayed indicating that an item that was previously added to the customer's shopping list is currently out-of-stock. Item description 320 may include an item name, price, and/or image. In alternative embodiments, item description 320 includes additional relevant information, such as an estimated restocking date and/or time. A list of potential substitute items 330 may further be produced on the display of smartphone 300 and the customer may be given the opportunity to substitute such items for the out-of-stock item by selecting a corresponding replace object 335. Alternatively, the customer may choose to leave the out-of-stock item in the shopping list by selecting object 340.

Figure 4:
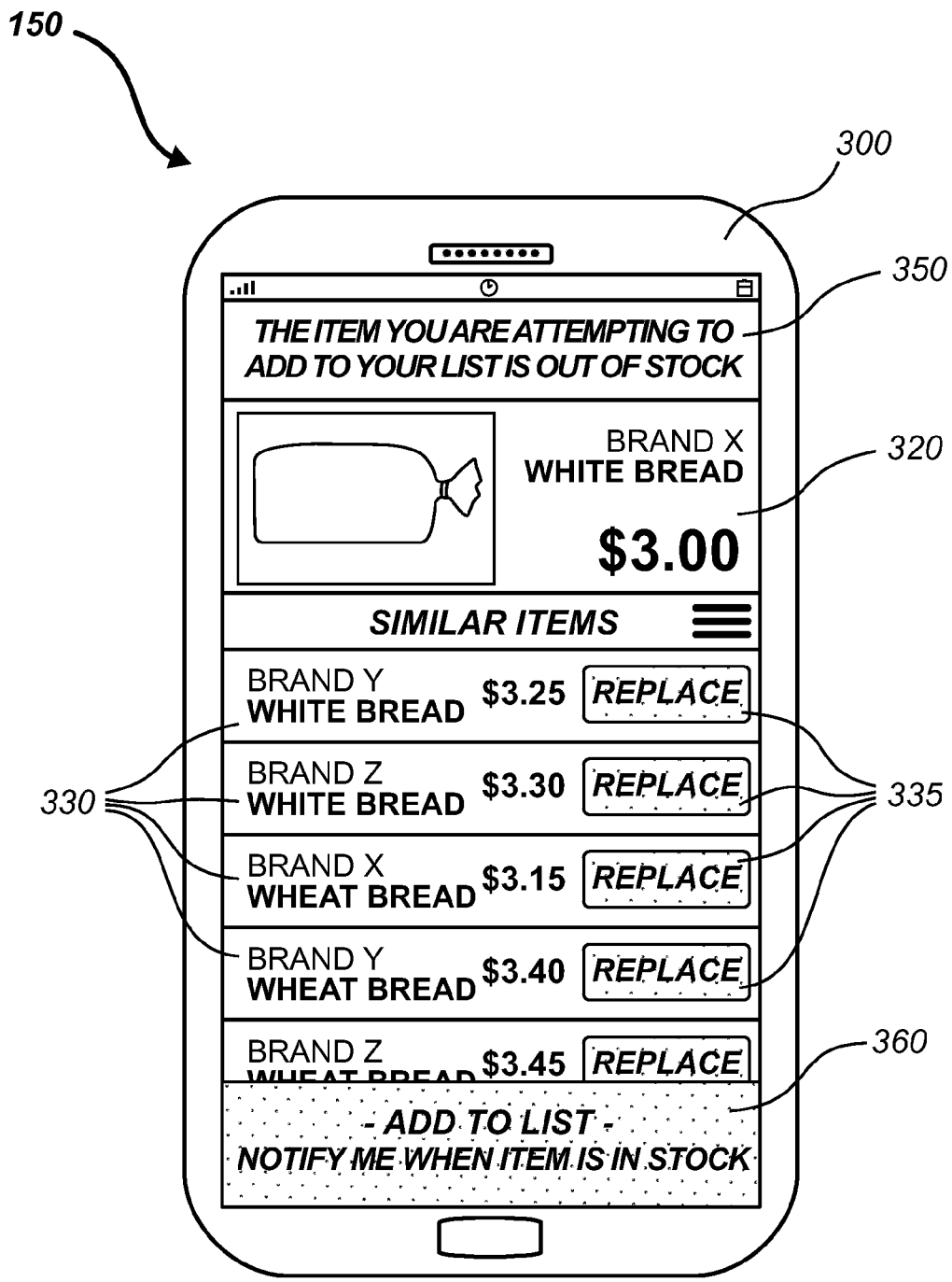
FIG. 4 is an illustration of a mobile computing device displaying an example graphical user interface having an out-of-stock alert for an item that a customer is attempting to add to the customer's shopping list.

Referring now to FIG. 4, a customer may attempt to add an item to the customer's shopping list when that item is already out of stock at the preferred store. In such a case, alert 350 may be created by customer smartphone app 150 on smartphone 300. The customer may be presented with a list of potential substitute items 330, which the customer may selectively add to the shopping list by selecting a corresponding replace object 335. Alternatively, the customer may choose to add the out-of-stock item to the shopping list by selecting object 360.

Figure 5:
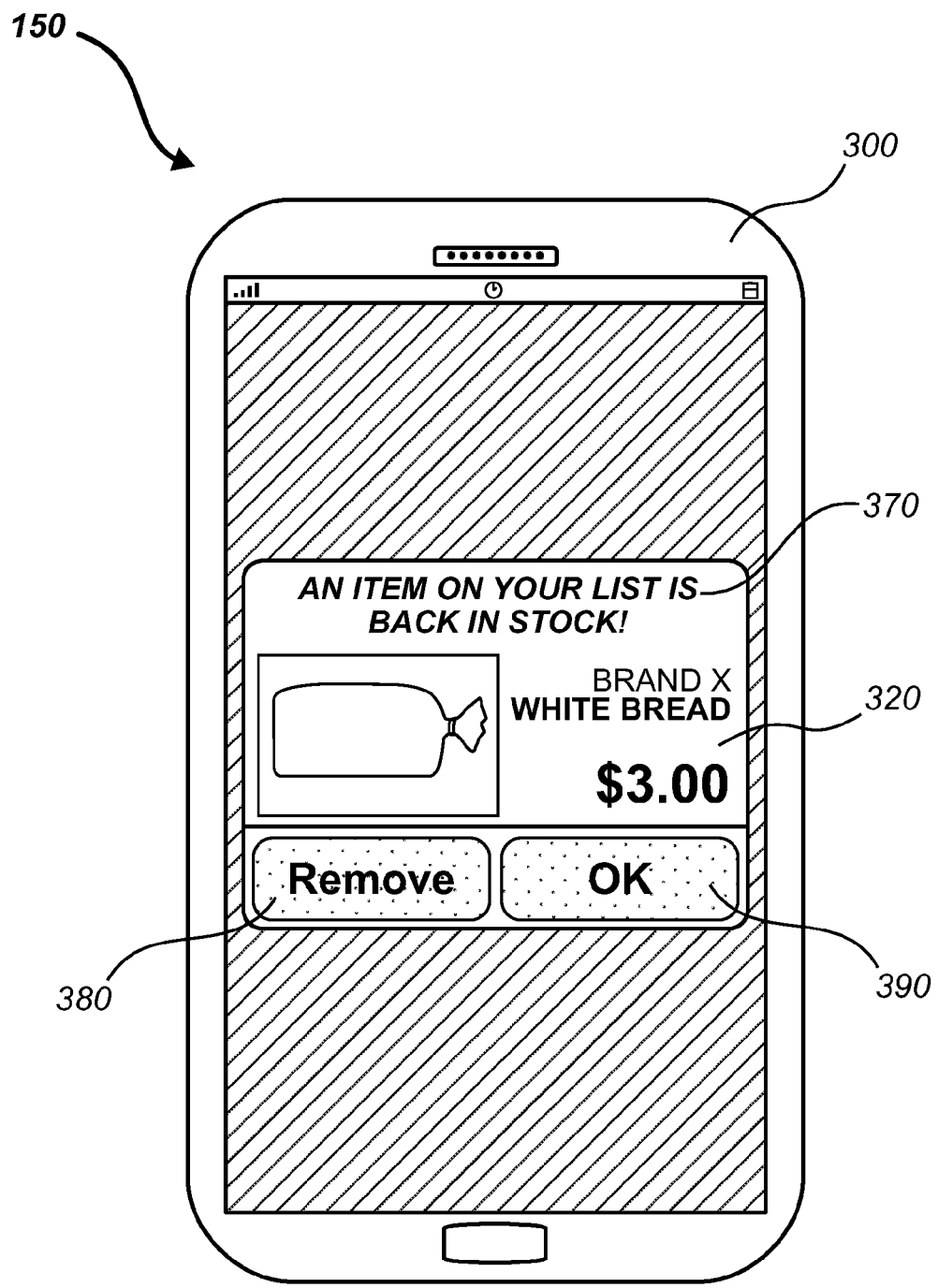
FIG. 5 is an illustration of a mobile computing device displaying an example graphical user interface having an in-stock alert for an item on a customer's shopping list.

Referring now to FIG. 5, a customer may have added an item to the customer's shopping list that was out of stock at the preferred store but subsequently came in stock. In such a case, alert 370 may be displayed by customer smartphone app 150 on smartphone 300. The customer may be presented with the option to remove the in-stock item from the customer's shopping list by selecting remove object 380. Alternatively, the customer may choose to keep the in-stock item in the shopping list by selecting object 390.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method for a shopping list item notification system comprising:
   receiving, using the shopping list item notification system, a request from a customer to download an electronic shopping list application (app), provided by a retailer, for installation by the customer on a mobile computing device of the customer;
   upon opening the electronic shopping list app, provided by the retailer, installed on the mobile computing device of the customer:
      receiving, at a notification module of a notification server, a list of one or more unique product identification codes comprising a store branch identifier corresponding to each product on an electronic shopping list of the customer on the electronic shopping list app on the mobile computing device of the customer;
      monitoring, by the notification module, a location of the customer by a location signal from the electronic shopping list app on the mobile computing device;
      identifying, by the notification module, a store branch of the retailer based on the store branch identifier of the one or more unique product identification codes;
      analyzing, by the notification module, a purchase history of the customer or preferences of the customer based on the identifying the store branch of the retailer;
      determining, by the notification module, that the mobile computing device has entered the store branch of the retailer based on the location signal, as received; and
      determining, by the notification module, an inventory status for the each product that corresponds to the one or more unique product identification codes in response to determining that the mobile computing device has entered the store branch, comprising whether the each product is in-stock or out-of-stock for purchase at the store branch of the retailer;
   when a product, listed in the electronic shopping list of the customer, is out-of-stock, transmitting an out-of-stock alert, by an electronic shopping list application server, to a graphical user interface of the electronic shopping list app on the mobile computing device of the customer to permit the customer to select at least one option displayed on the graphical user interface, the at least one option comprising:
      to keep or remove the product from the electronic shopping list;
      to notify the customer when the product is back in-stock at the store branch;
      to query a product inventory database for the inventory status of the product at other retail store branches of the retailer preferred by the customer; or
      to replace the product with another product from a list of substitute products available at the store branch; and
   when the product is back in-stock at the store branch, transmitting a back-in-stock alert, by the electronic shopping list application server, to the graphical user interface of the electronic shopping list app on the mobile computing device of the customer, as requested, when the customer has kept the product on the electronic shopping list.

2. The method of claim 1, wherein identifying the store branch comprises analyzing customer location data gathered by the mobile computing device, wherein the identifying comprises identifying the store branch closest to a work place or residence of the customer.

3. The method of claim 1, wherein determining, by the notification module, the inventory status for the each product further comprises receiving a product selection from the mobile computing device to query the product inventory database for an update on the inventory status of the product.

4. The method of claim 1, further comprising:
   receiving a signal indicating a user selection of a substitute product from the list of substitute products; and
   modifying the electronic shopping list to replace the product with the selected substitute product.

5. The method of claim 1, wherein determining, by the notification module, the inventory status for the each product further comprises automatically updating the inventory status for the each product upon receiving and analyzing transaction data.

6. The method of claim 1, wherein when the product, listed in the electronic shopping list of the customer, is out-of-stock, the at least one option further comprises:
to request an estimated date for re-stocking the product at the store branch.

7. The method of claim 1, further comprises:
identifying, by the notification module, when the customer has not selected a preferred store branch of the retailer, an implicit preference of a particular store branch preferred by the customer based on the purchase history of the customer.

8. The method of claim 1, wherein the out-of-stock alert and the back-in-stock alert further comprise haptic stimuli selected as a preferred alert by the customer.

9. The method of claim 1, transmitting an out-of-stock alert further comprises:
transmitting an out-of-stock alert to the customer based on a date and time of an anticipated shopping trip by the customer.

10. A shopping list item notification system, comprising:
a product inventory database adapted to record an inventory status for at least one product listed on a customer's electronic shopping list;
a plurality of servers comprising:
an application server; and
a notification server including a notification module,
the plurality of servers comprising one or more processors and one or more memory devices operably coupled to the one or more processors and storing executable and operational notification data, the executable and operational notification data effective to cause the one or more processors to:
receive a request from a customer to download an electronic shopping list application (app), provided by a retailer, for installation by the customer on a mobile computing device of the customer;
upon opening the electronic shopping list app, provided by the retailer, installed on the mobile computing device of the customer:
receive a list of one or more unique product identification codes comprising a store branch identifier corresponding to each product on an electronic shopping list of the customer on the electronic shopping list app on the mobile computing device of the customer;
monitor a location of the customer by a location signal from the electronic shopping list app on the mobile computing device;
identify a store branch of the retailer based on the store branch identifier of the one or more unique product identification codes;
analyze a purchase history of the customer or preferences of the customer based on the identifying the store branch of the retailer;
determine that the mobile computing device has entered the store branch of the retailer based on the location signal, as received; and
determine an inventory status for the each product that corresponds to the one or more unique product identification codes in response to determining that the mobile computing device has entered the store branch, comprising whether the each product is in-stock or out-of-stock for purchase at the store branch of the retailer;
when a product, listed in the electronic shopping list of the customer, is out-of-stock, transmitting an out-of-stock alert, by an electronic shopping list application server, to a graphical user interface of the electronic shopping list app on the mobile computing device of the customer to select at least one option displayed on the graphical user interface, the at least one option comprising:
to keep or remove the product from the electronic shopping list;
to notify the customer when the product is back in-stock at the store branch;
to query the product inventory database for the inventory status of the product at other retail store branches of the retailer preferred by the customer; or
to replace the product with another product from a list of substitute products available at the store branch; and
when the product is back in-stock at the store branch, transmitting a back-in-stock alert, by the electronic shopping list application server, to the graphical user interface of the electronic shopping list app on the mobile computing device of the customer, as requested, where the customer has kept the product on the electronic shopping list.

11. The system of claim 10, the application server further comprising one or more application server processors and one or more application server memory devices operably coupled to the one or more application server processors and storing executable and operational application server data, the executable and operational application server data effective to cause the one or more application server processors to interface with a mobile computing software application by receiving a unique product identifier code from the electronic shopping list app on the mobile computing device, wherein a location of the each product is located at any store branch by the unique product identifier code.

12. The system of claim 11, wherein the executable and operational application server data is effective to cause the one or more application server processors to transmit the out-of-stock alert to the mobile computing software application, wherein the out-of-stock alert causes the mobile computing software application to audibly notify the customer that the at least one product is out-of-stock.

13. The system of claim 10, wherein the out-of-stock alert and the back-in-stock alert further comprise haptic stimuli selected as a preferred alert by the customer.

14. The system of claim 10, further comprising a customer location module comprising one or more customer location processors and one or more customer location memory devices operably coupled to the one or more customer location processors and storing executable and operational customer location data, the executable and operational customer location data effective to cause the one or more customer location processors to receive location data from the electronic shopping list app on the mobile computing device.

15. The system of claim 10, further comprising an update module comprising one or more update processors and one or more update memory devices operably coupled to the one or more update processors and storing executable and operational update data, the executable and operational update data effective to cause the one or more update processors to update the inventory status for the at least one product listed on the customer's electronic shopping list.

16. The system of claim 15, wherein the executable and operational update data is effective to cause the one or more update processors to receive and analyze transaction data to automatically update the inventory status for the at least one product listed on the customer's electronic shopping list.

17. The system of claim 10, wherein the executable and operational application server data is effective to cause the one or more application server processors to receive a signal indicating a user selection of a substitute product from the list of substitute products and modify the electronic shopping list to replace the at least one product with the selected substitute product.

18. The system of claim 10, wherein when the product, listed in the electronic shopping list of the customer, is out-of-stock, the at least one option further comprises:
   to request an estimated date for re-stocking the product at the store branch.

19. The system of claim 10, further comprising:
   identifying, by the notification module, when the customer has not selected a preferred store branch of the retailer, an implicit preference of a particular store branch preferred by the customer based on the purchase history of the customer.

20. The system of claim 10, transmitting an out-of-stock alert further comprises:
   transmitting an out-of-stock alert to the customer based on a date and time of an anticipated shopping trip by the customer.

* * * * *